US008871525B2

(12) United States Patent
Martin et al.

(10) Patent No.: US 8,871,525 B2
(45) Date of Patent: Oct. 28, 2014

(54) MASS SPECTROMETRY METHOD

(75) Inventors: Kevin Martin, Solana Beach, CA (US); Markus Herrgard, San Diego, CA (US); Kathleen Reeves, San Diego, CA (US)

(73) Assignee: Synthetic Genomics, Inc., La Jolla, CA (US)

( * ) Notice: Subject to any disclaimer, the term of this patent is extended or adjusted under 35 U.S.C. 154(b) by 262 days.

(21) Appl. No.: 13/250,758

(22) Filed: Sep. 30, 2011

(65) Prior Publication Data

US 2012/0083041 A1 Apr. 5, 2012

Related U.S. Application Data

(60) Provisional application No. 61/389,103, filed on Oct. 1, 2010.

(51) Int. Cl.
*G01N 24/00* (2006.01)
*H01J 49/00* (2006.01)

(52) U.S. Cl.
CPC .................................. *H01J 49/0009* (2013.01)
USPC .............................. 436/173; 436/141; 702/24

(58) Field of Classification Search
None
See application file for complete search history.

(56) References Cited

U.S. PATENT DOCUMENTS 7,493,225 B2 * 2/2009 Wang et al. .................... 702/85

* cited by examiner

*Primary Examiner* — Robert Xu
(74) *Attorney, Agent, or Firm* — DLA Piper LLP (US)

(57) ABSTRACT

The invention provides a mechanism for semi-quantitatively measuring individual isotopomer species of a molecule using gas chromatograph mass spectrometry. The method allows for semi-quantitatively tracking the movement of ions by measuring the individual isotopomer species of a molecule.

31 Claims, 7 Drawing Sheets

GC trace of methane

Figure 1: GC trace of methane

Figure 2: MS trace of $CH_4$

Figure 3: MS trace of $CH_3D$

Figure 4: MS trace of $CH_2CD_2$

Figure 5. MS trace of $CHD_3$

Figure 6. MS trace of $CD_4$

SEQUENCE LISTING

```
<160> NUMBER OF SEQ ID NOS: 3

<210> SEQ ID NO 1
<211> LENGTH: 35
<212> TYPE: DNA
<213> ORGANISM: Artificial Sequence
<220> FEATURE:
<223> OTHER INFORMATION: Primer

<400> SEQUENCE: 1

gttgcacatg ttagggcaaa tgaacaccgc agacc                                35


<210> SEQ ID NO 2
<211> LENGTH: 44
<212> TYPE: DNA
<213> ORGANISM: Artificial Sequence
<220> FEATURE:
<223> OTHER INFORMATION: Primer

<400> SEQUENCE: 2

ctacgttaac gacagagatc tttattccca aatttcacag gcca                      44


<210> SEQ ID NO 3
<211> LENGTH: 1836
<212> TYPE: DNA
<213> ORGANISM: Artificial Sequence
<220> FEATURE:
<223> OTHER INFORMATION: Synthetic construct

<400> SEQUENCE: 3

actagtcctg aggtgttgac aattaatcat ccggctcgta taatgtgtgg aattgtgagc      60

ggataacaat ttcacacagg aaacagacca tgttagggca aatgaacacc gcagacctat     120

tggttcaatg tctggaaaat gaggacgttg aatacatttt tggcgtaccc ggagaggaaa     180

acctccacat cctcgaagcg ctgaaaaact cgcccatccg ctttattacc acccgccacg     240

aacagggagc agcctttatg gccgacgttt acggccgttt aacgggcaaa gcgggggttt     300

gtctttccac cctggggcct ggagccacca acctgatgac cggggtagcg gatgctaact     360

tggacggagc gcccctggtg gccatcactg gacaggtggg cacagatcgg atgcacatcg     420

aatcccacca atacctggac ttggtggcca tgttcgaccc ggtgactaaa tggaccaggc     480

aaattgtccg ccccagcatt accccggaag tggttcgtaa agcgttcaaa ttggctcaga     540

gcgaaaaacc aggggccacc cacattgatt taccagaaaa tattgccgct atgccggtgg     600

atgggaaacc cctacggcgg gacagtcggg aaaaggttta tgcagctttt cgtactttgg     660

gcacagcggc caacgccatt tccaaggcca aaaaccccat tattctggcc ggcaatggca     720

ccatccgagc cgaagccagc gaagccctga cggaatttgc caccagtttg aatattcccg     780

tggccaacac cttcatgggt aaaggcacca tgccctacac ccatcccctt tccctttgga     840
```

-continued

```
cagtgggctt acaacaacgg gatcacatta cctgtgcctt tgaaaaaagc gatttggtca    900
ttgcggtggg ctatgactta attgaatatt ctccgaaaaa atggaatccc actggagatt    960
tgcccatcat tcacattggc gctactccgg cggaaattga tagcagttat attccccagg   1020
tggaggtggt gggggacatt accgattccc tgatggattt gctcaaacgg tgcgatcgcc   1080
aaggtaaacc cactccctac ggggcttctc tccgggcgga aattcgggcc gagtatgaat   1140
gttatgccaa tgacacaggt tttcccgtta agccacaaaa aattatttat gacctgcgcc   1200
aagtgatggg ccccgatgat gtggtgattt ccgatgtggg ggcccataaa atgtggatgg   1260
cccgccatta ccactgtgac agccccaaca cctgtttaat ttccaatggt tttgcggcca   1320
tgggcattgc cattccaggg gcgatcgccg ctaagctggt ttatcctgag cgcaacattg   1380
ttgcagtgac gggggacggc ggttttatga tgaactgtca ggagttggaa acggccatgc   1440
gggtgggcac tccctttgtc acgttgattt ttaacgacaa cggttacggc ctaattgagt   1500
ggaaacagat caaccaattt ggcgaatcca gctttattaa atttggcaat ccagactttg   1560
ttaagtttgc tgaaagtatg ggtctcaaag gttatcgggt ggaagcggcg gcggatttaa   1620
ttcctatcct caaagaagct ttagctcaac ctgtgcccac agtgattgat tgtcctgtgg   1680
attatcggga gaatattcgt ttctcgcaaa aagcagggga attggcctgt gaaatttggg   1740
aataaagatc tgatccgctg ttgacccaac agcatgagtc gttatccaag gggagcttcg   1800
gctccctttt ttcatgcgcg gatgcggtga gagctc                              1836
```

MASS SPECTROMETRY METHOD

CROSS-REFERENCES TO RELATED APPLICATIONS

This application claims benefit of U.S. provisional patent application 61/389,103, filed Oct. 1, 2010, which is incorporated by reference in its entirety.

BACKGROUND OF THE INVENTION

Gas chromatography (GC) is an established analytical technique used for the separation, qualification and quantification of a broad range of volatile compounds that are not susceptible to decomposition upon vaporization. Relative retention times can be used to identify specific analytes in a crude sample or mixture of compounds provided the method conditions are constant and the retention time of the analyte of interest is known under the same set of conditions. A number of detectors may be used in GC, however, some GCs are connected to a Mass Spectrometer, which acts as the detector.

Mass Spectrometry (MS) is an analytical tool that measures the mass-to-charge ratio of charged particles. The MS technique for the analysis of compounds involves ionization of chemical compounds in a sample to generate high-energy charged parent molecules and fragments thereof. MS is commonly used for the qualitative analysis of organic compounds. MS can be used for the elucidation of compounds by manual interpretation of the resulting ion fragmentation pattern, which is unique to a specific compound under a given set of conditions, or by comparison to a mass spectral library of known compounds, including peptides.

Currently, sample identification using the gas chromatography-mass spectrometry interface (GC-MS or GC/MS) is predominantly based on the use of 70 eV electron ionization (EI) mass spectral libraries. In GC-MS, the sample is separated by the GC component into constituent analytes, which are then individually detected by the mass spectrometer. A mass spectrum is generated for each analyte in the sample mixture and is used for the identification of compounds in the mixture. Library-based sample identification is performed by comparing the experimental mass spectrum to all the library mass spectra and, then, the provision of a possible list of candidates for the sample identity with reducing order of fitting or of a matching parameter. Sample identification with MS libraries is, thus, predominantly based on fragment ions that provide a compound specific fingerprint. The structure of a specific molecule is elucidated through a set of fragment masses recorded by a detector and represented by a mass spectrum. Interpretation of the mass spectrum can be accomplished in several ways e.g., by comparison of the mass spectrum against a mass spectral library or by accurate mass.

MS libraries are both powerful and easy to identify compounds. However, sample identification with MS libraries has three major limitations: (1) given the millions of possible compounds, the libraries cannot be completely comprehensive; (2) a library can fail in sample identification because the sample is not included in the library, due to co-elution of two or more compounds or due to statistical errors; and (3) about 30% of sample compounds do not show a significant molecular ion in their 70 eV electron ionization MS. Thus, for some compounds, sample identification through libraries alone is not completely reliable due to the possibility of false identification of a similar compound or a degradation product.

Mass spectral sample identification achieved by measuring accurate mass typically involves mass measurement precision of a few parts per million, followed by computer based conversion of that accurate mass into a list of potential elemental formulas, which are arranged in order of increased deviation from the measured mass. For such inversion of experimental data into an elemental formula, the user must provide as an initial input parameter a short list of possible elements, otherwise the generated hit list will be too large and the calculation time too long even with the most powerful computers. The accurate mass method will not provide any information if the molecular ion does not appear in the mass spectrum and may provide false identification of a fragment or impure ion.

SUMMARY OF THE INVENTION

Gas chromatography-mass spectrometry, to date, has been used to measure the total percentage of deuterium incorporation into a chemical compound compared to an unlabeled chemical compound control.

The present invention provides new methods for measuring individual species of isotopomers of a chemical compound using mass spectrometry.

Chemical compounds have varying numbers of isotopomeric species and the masses of each isotopomer result in a separate peak thereby generating multiple peaks for a single species. The present invention methods provide the first proof-of-concept demonstrating the ability to measure the relative amounts of each individual species of isotopomer of standards and chemical compounds using mass spectrometry. This is the first identified method that is able to assess relative amounts of specific species of isotopomers rather than an overall percentage of deuterated product.

Broadly, these methods are applicable to assessing incorporation of hydrogen from a source into any product that contains hydrogen. For example, the methods could be use to assess incorporation of hydrogen from a source (e.g., $H_2O$, methoxy groups, $H_2$) into any compound that contains hydrogen. The process can be conducted by hand or automated. Products that can be analyzed using the described methods encompass any compound that contains hydrogen.

For example, provided herein is a new method for measuring deuterium incorporation into methane by measuring each of the individual isotopomers of methane using gas chromatography mass spectrometry. The method is used to measure the amount of deuterium incorporation into coalbed methane (CBM) by measuring the individual isotopomers of methane or deuterated methane. The present methods can also be used to determine where hydrogen ions are moving in a pathway such as, for example, during fatty acid formation by algae. The ability to semi-quantitatively assess each isotopomeric species rather than obtain an overall percentage of deuterated product represents an advance in this field.

BRIEF DESCRIPTION OF THE DRAWINGS

The novel features of the invention are set forth with particularity in the appended claims. A better understanding of the features and advantages of the present invention will be acquired by reference to the following detailed description that sets forth illustrative embodiments, in which the principles of the invention are utilized, and the accompanying drawings of which:

DETAILED DESCRIPTION OF THE INVENTION

Figure 1:
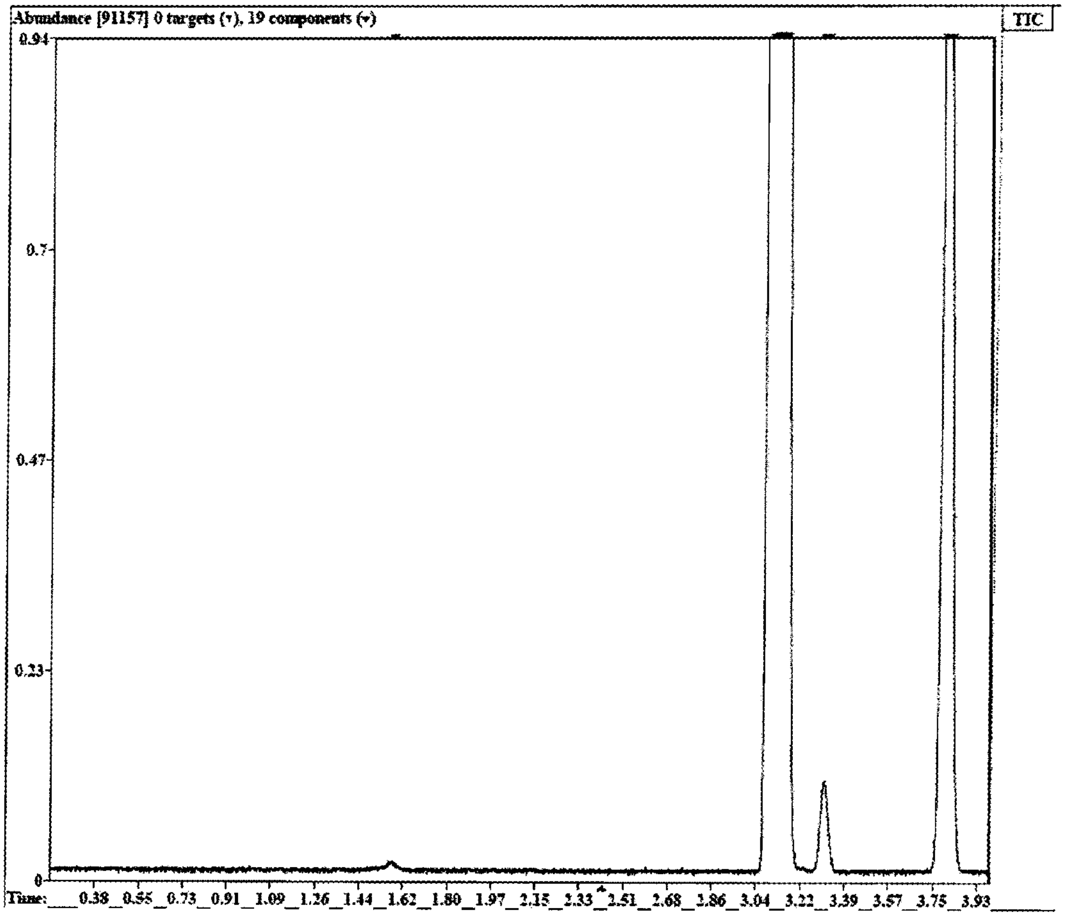
FIG. 1 illustrates the retention times of nitrogen, methane and $CO_2/H_2O$, respectively, over time.
Figure 2:
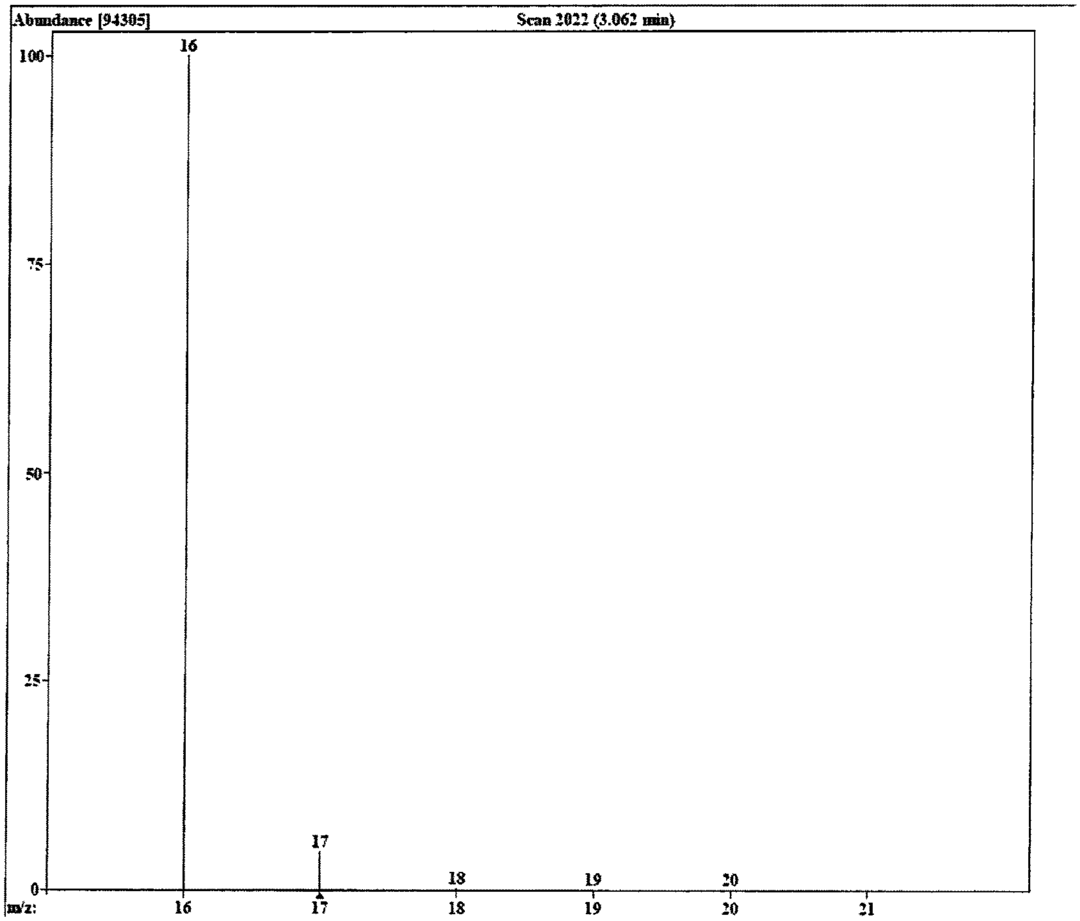
FIG. 2 shows the observed masses of $CH_4$ at a single time point.
Figure 3:
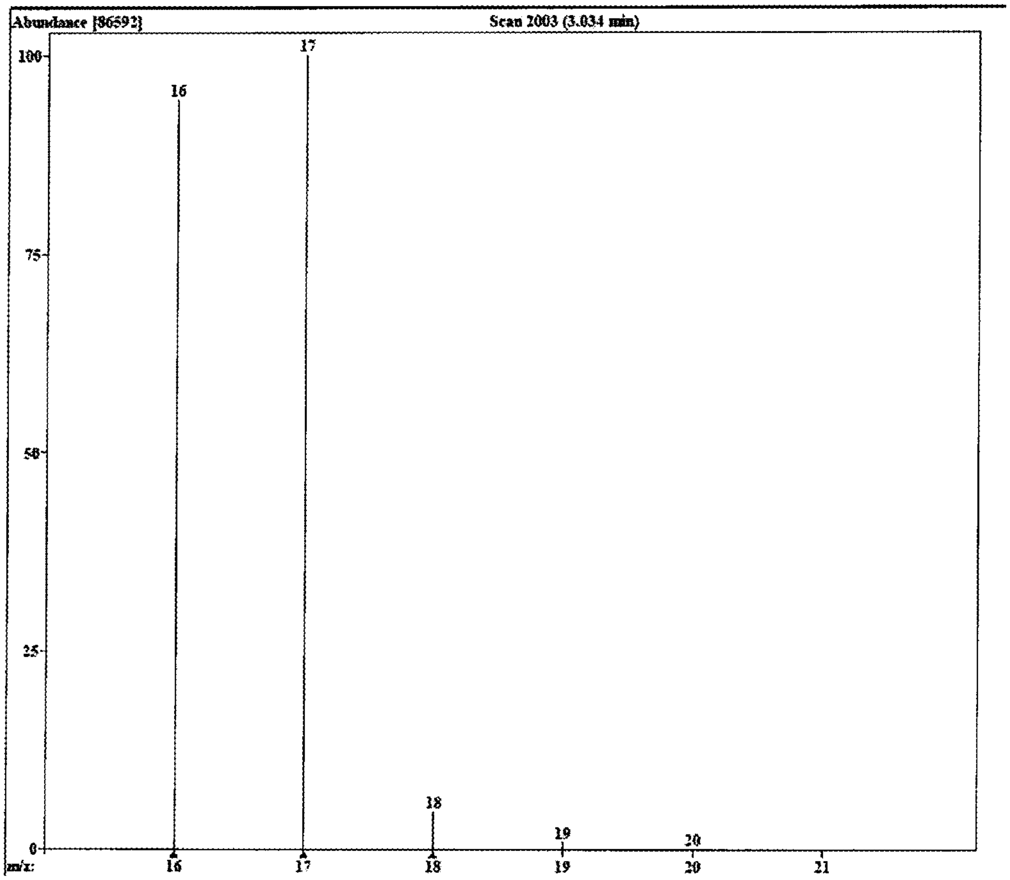
FIG. 3 shows the observed masses of $CH_3D$ at a single time point.
Figure 4:
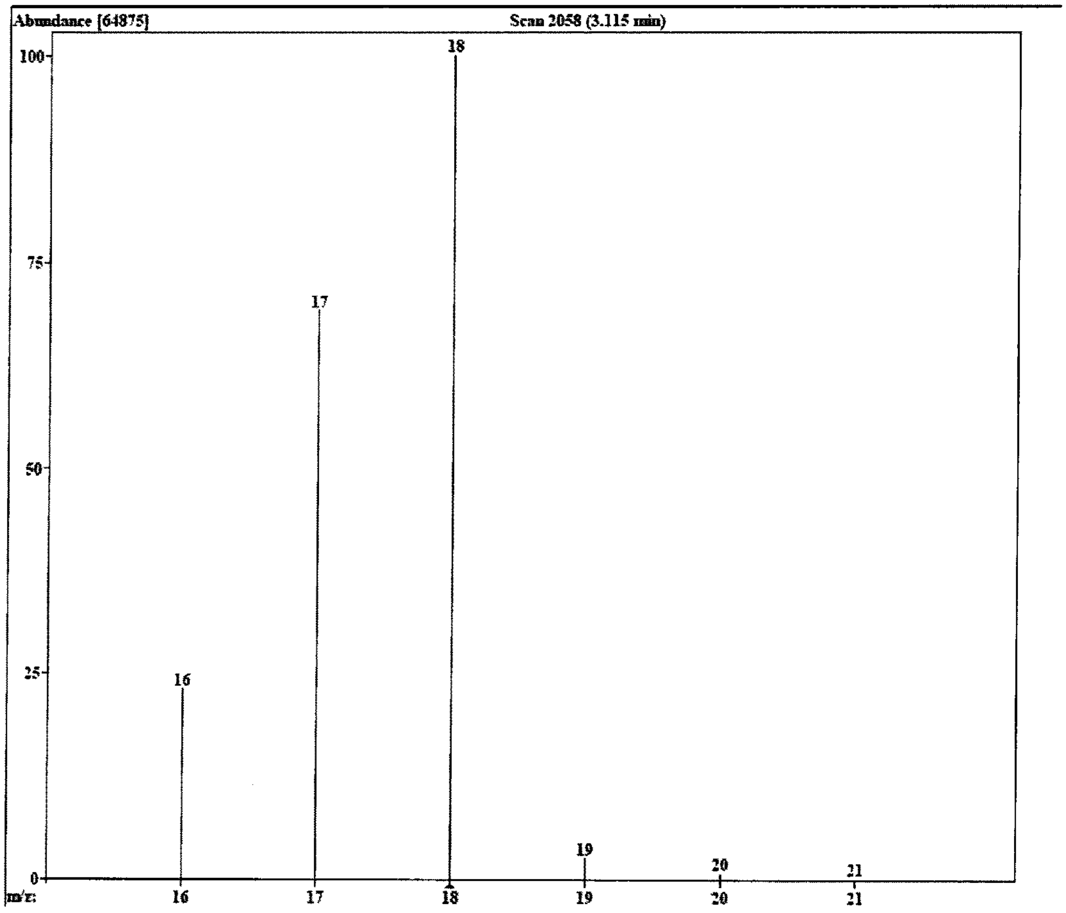
FIG. 4 shows the observed masses of $CH_2D_2$ at a single time point.
Figure 5:
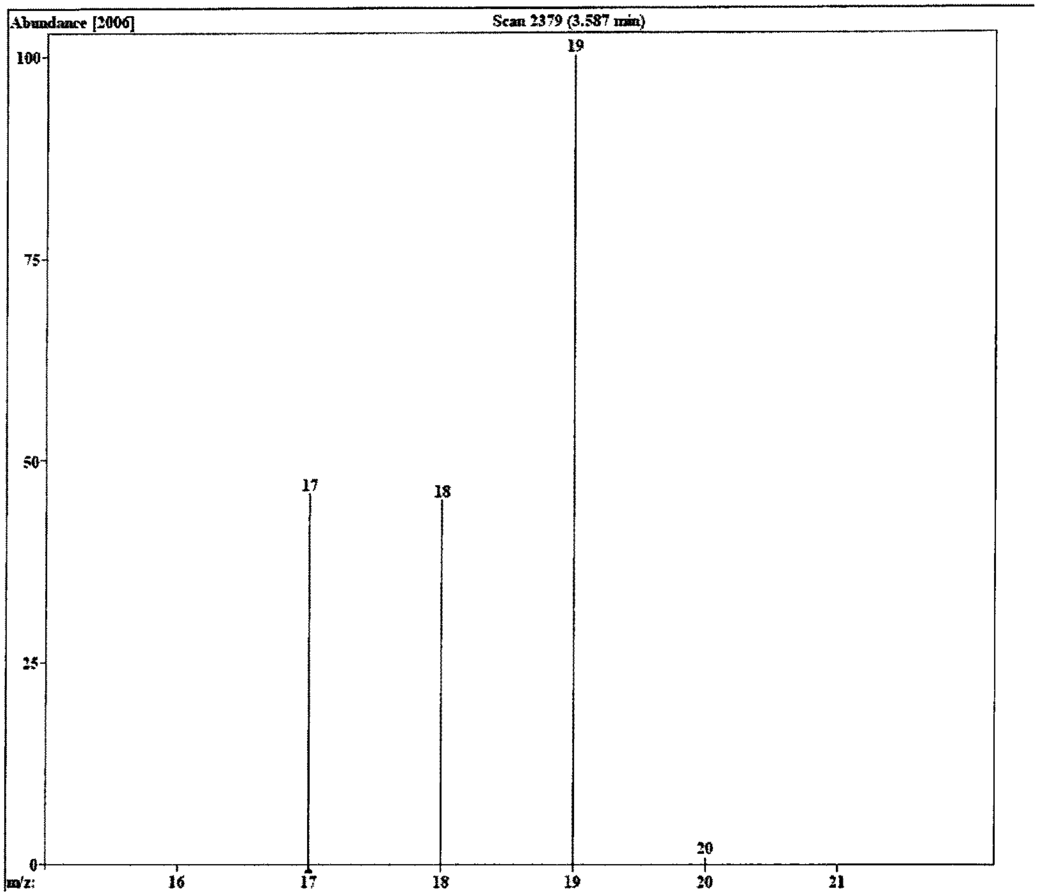
FIG. 5 shows the observed masses of $CHD_3$ at a single time point.
Figure 6:
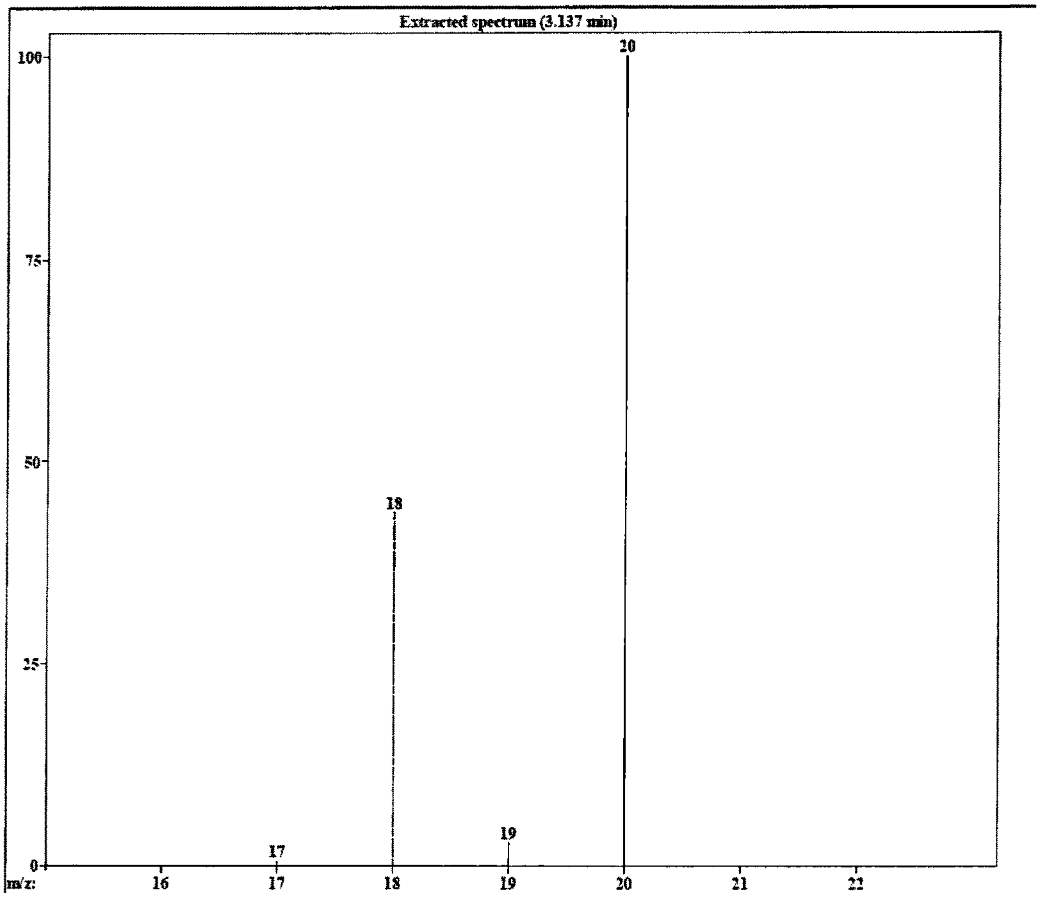
FIG. 6 shows the observed masses of $CD_4$ at a single time point.

All publications and patent applications mentioned in this specification are herein incorporated by reference to the same extent as if each individual publication or patent application was specifically and individually indicated to be incorporated by reference.

Headings provided herein are solely for the convenience of the reader, and are not limiting to the invention.

Unless defined otherwise, all technical and scientific terms used herein have the same meaning as commonly understood by one of ordinary skill in the art to which this invention is related. The following terms are defined for purposes of the invention as described herein.

The singular form "a", "an" and "the" include plural referents unless the context clearly dictates otherwise. Thus, for example, reference to "a compound" includes a plurality of compounds and reference to "an isotopomer" includes a plurality of isotopomers, etc.

As used herein, the terms "about" or "approximately" when referring to any numerical value are intended to mean a value of plus or minus 10% of the stated value. For example, "about 50° C." (or "approximately 50° C.") encompasses a range of temperatures from 45° C. to 55° C., inclusive. Similarly, "about 100 mM" (or "approximately 100 mM") encompasses a range of concentrations from 90 mM to 110 mM, inclusive. All ranges provided within the application are inclusive of the values of the upper and lower ends of the range.

Mass Spectrometry

Mass spectrometry (MS) provides a means for the determination of the elemental composition of a sample or molecule and may also be used for elucidation of chemical structures. MS entails the ionization of chemical compounds to generate charged molecules or molecular fragments and measurement of their mass-to-charge ratios. There are a number of different types of MS which can be used to test compounds present in the gaseous or liquid phase.

Gas Chromatography-Mass Spectrometry (GC-MS)

The GC-MS interface is a technique that combines the features of gas-liquid chromatography and mass spectrometry to identify different substances within a test sample. Applications of GC-MS include drug detection, fire investigation, environmental analysis, explosives investigation, and the identification of unknown analytes. GC-MS can also be used in airport security to detect substances in luggage or on human beings. Additionally, GC-MS can identify trace elements in materials that were presumed to have disintegrated beyond identification.

For the analysis of volatile compounds a Purge and Trap (P&T) concentrator system may be used to introduce samples in the GC-MS instrument. The target analytes are extracted, mixed with water and subsequently introduced into an airtight chamber. An inert gas, such as nitrogen ($N_2$), is bubbled through the water, in a process known as purging. The volatile compounds migrate into the headspace above the water and are drawn along a pressure gradient (caused by the introduction of the purging gas) out of the chamber. The volatile compounds are drawn along a heated line onto a "trap," which is a column of adsorbent material at ambient temperature that holds the compounds by returning them to the liquid phase. The trap is then heated and the sample compounds are introduced to into the GC-MS column via a volatiles interface, which is a split inlet system. P&T GC-MS is particularly suited to volatile organic compounds (VOCs) and aromatic compounds associated with petroleum (BTEX compounds). Alternatively, automation of the GC-MS procedure with a headspace unit in dynamic mode can be used to introduce samples.

GC-MS is a reliable, effective tool of choice for tracking organic pollutants in the environment, which has contributed to its increased adoption in environmental studies.

Liquid Chromatography-MS (LC-MS) or High Performance LC-MS (HPLC-MS)

LC-MS is an analytical chemistry technique that combines the physical separation capabilities of high-performance liquid chromatography (HPLC) with the mass analysis capabilities of mass spectrometry. LC-MS is a powerful tool with very high sensitivity and specificity used for many applications. Generally, its application is oriented towards the detection and potential identification of specific chemicals in the presence of other chemicals (in a complex mixture). Traditional HPLC and the chromatography used in LC-MS differ in that, in LC-MS, the scale is usually much smaller with respect to the internal diameter of the column and the flow rate since it scales as the square of the diameter.

Ion Chromatography-Mass Spectrometry (IC-MS)

IC-MS can be used to detect and measure ionic compounds. First, the ion mobility spectrometer separates ions according to their mobilities. Second, a mass analyzer stabilizes the ions and in a third step the mass spectrometer separates ions according to their mass-to-charge ratio. The use of multiple rounds of mass spectrometry is known as tandem mass spectrometry (MS/MS). Ions are typically generated by either matrix-assisted laser desorption/ionization (MALDI) or electrospray ionization (ESI) and are then directed into the ion-mobility (IM) drift cell. Four primary methods are used to separate ions in neutral gases on the basis of ion mobility, which can be delineated as ion separation selectivity based on space dispersion or time dispersion, respectively. Owing to the multiplex data acquisition of fragment ion spectra, IM-MS/MS experiments are particularly useful when analyzing multiple analytes in fast transient signals from additional dimensions of separation prior to IM-MS, or when multiple MS/MS analyses are desired from limited samples. MS/MS (tandem mass spectrometry) involves multiple steps of mass spectrometry selection, with some form of fragmentation occurring in between the stages. By doing tandem mass spectrometry in time, the separation is accomplished with ions trapped in the same place, with multiple separation steps taking place over time.

Semi-Quantitative Measurement of Individual Isotopomers

Described herein is a method of quantitating isotopomers of a hydrogen-containing compound by creating a calibration table of ratio of masses for standard isotopomers using a mass spectrometer; creating an equation which relates the ratio of observed mass distributions of standard isotopomers to the relative amounts of each standard isotopomer in the sample; and applying the equation to the ratio of masses identified in a sample to quantitate the relative amount of each isotopomer of a hydrogen-containing compound. In such methods, the equation can be computed with a general purpose computer.

In certain embodiments, an isotopomer can contain one or more deuterium atoms.

In one aspect, the method further includes contacting a hydrogen-deficient compound with a solution comprising deuterium-oxide; and measuring the relative amounts of each isotopomer of a product compound using mass spectrometry in order to measure the amount of deuterium incorporation into a hydrogen-containing compound.

The methods can also further include contacting a hydrogen-deficient compound with a solution comprising $D_2$; and measuring the relative amounts of each isotopomer of a product compound using mass spectrometry in order to measure the amount of deuterium incorporation into a hydrogen-containing compound.

The number of isotopomers of a compound is determined by assessing the number of hydrogen atoms in a compound. Isotopomers of compounds can contain 0, 1, 2, 3, 4, 5, 6, 7, 8, 9, 10, 11, 12, 13, 14, 15, 16, 17, 18, 19, 20 or more deuterium atoms depending upon the chemical formula of the compound. A hydrogen-containing compound can contain 0, 1, 2, 3, 4, 5, 6, 7, 8, 9, 10, 11, 12, 13, 14, 15, 16, 17, 18, 19, 20 or more hydrogen atoms depending upon the chemical formula of the compound.

Compounds that can be tested using methods described herein include, linear, cyclic and branched compounds. In one embodiment, a compound to be assessed is a hydrocarbon. Hydrocarbons include, but are not limited to alkanes, alkenes, and aromatic compounds. It is to be understood that a hydrogen-deficient compound can be part of a mixture of compounds found in a hydrocarbon material.

An alkane is, for example, methane, ethane, propane, n-butane, 2-methylbutane, isobutane, cyclobutane, pentane, isopentane (2-methylbutane), neopentane (2,2-dimethylpropane), cyclopentane, hexane, 3-methylhexane, heptane, octane, nonane, decane, hexadecane, iso-octane, and the like.

An alkene is, for example, ethylene, butene, butadiene, pentene, hexene, polyethylene, polypropylene, polybutadiene, and the like.

An aromatic compound is, for example, benzene or a derivative thereof, furan, thiophene, pyridine, pyrimidine, toluene, benzoic acid, naphthalene, anthracene, tetracene, pentacene, phenanthrene, triphenylene, quinoline, purine a polyaromatic hydrocarbon (PAH) and the like. PAHs include, but are not limited to, naphthalene, tetracene, phenanthrene, benzy[a]pyrene, anthracene, chrysene, pentacene, acenaphthene, acenaphthylene, phenanthrene, fluorene, fluoranthene, benzo(a)anthracene, pyrene, benzo[b]fluoranthene, benzo[k] fluoranthene, dibenz[a,h]anthracene, benzo[g,h,i]perylene, indeno [1,2,3-cd]pyrene, and the like. Aromatic compounds to be assessed can contain any number of rings of various sizes. An aromatic compound can contain from 1 to about 50 rings. In one embodiment, an aromatic compound contains up to 100 carbon atoms (i.e., up to a $C_{100}$ compound).

Hydrocarbons found in crude petroleum can be refined into the components of gasoline, jet fuel, and diesel and the described method can be used to determine the mechanism of the reactions. The term “gasoline” refers to $C_4$ to $C_8$ compounds such as, for example, 2-methylbutane, isobutane, cyclobutane, pentane, isopentane (2-methylbutane), neopentane (2,2-dimethylpropane), cyclopentane, hexane, 3-methylhexane, heptane, iso-octane, octane, etc. The term “jet fuel” refers to $C_8$ to $C_{12}$ compounds such as, for example, n-octane, n-nonane, n-decane, n-undecane, n-dodecane, etc. The term “diesel” refers to, for example, straight chain alkanes from $C_{12}$ to $C_{24}$, etc.

Alternatively, algae can be used to make various products such as lipids and carbohydrates which can be further converted into fuel molecules (e.g., gasoline, jet fuel, diesel, biodiesel, alcohols, etc.). One example of the mass spectrometry method is to feed algae deuterated water ($D_2O$) instead of water and monitor where hydrogen atoms are incorporated into end products (e.g., lipids, etc.).

“Biofuels” as used in the present invention refer to solid, liquid or gaseous fuel derived from plant materials, biomass, sugars or starches, such as ethanol, biodiesel derived from vegetable oils, and the like. A biofuel is a fuel in its own right, but may be blended with petroleum-based fuels to generate a hybrid fuel. A biofuel may be used as a replacement for petrochemically-derived gasoline, diesel fuel, or jet fuel.

Other exemplary hydrogen-containing compounds that can be assessed using the described methods include, but are not limited to, alcohols, ethers, carboxylic acids, esters, amides, amines, lipids, carbohydrates, and the like.

Alcohols include, but are not limited to, methanol, ethanol, butanol, propanol, isopropanol, isobutanol, 3-methylbutanol, 2-methylbutanol, and the like.

Ethers include, but are not limited to, dimethyl ether, diethyl ether, methyl ethyl ether, isopropyl ethyl ether, tetrahydrofuran, and the like.

Carboxylic acids include, but are not limited to, acetic acid, propionic acid, isobutyric acid cyclohexanoic acid, benzoic acid, and the like.

Ethers include, but are not limited to, methyl acetate, ethyl acetate, isobutyl acetate, methyl benzoate, ethyl propionate, benzyl acetate, and the like.

Amides include, but are not limited to, acetamide, propanamide, methylacetamide, N-isopropylpropionamide, dimethylacetamide, N-methylcyclohexanecarboxamide, acetanilide, and the like.

Amines include, but are not limited to, methyl amine, dimethylamine, trimethylamine, ethylisobutylamine, ethylmethylamine, cyclohexylamine, piperidine, aniline, and the like.

Lipids can, generally, be divided into eight categories: fatty acyls, glycerolipids, glycerophospholipids, sphingolipids, saccharolipids, polyketides, sterol lipids and prenol lipids. Lipids also encompass molecules such as fatty acids and their derivatives (including tri-, di-, and monoglycerides and phospholipids), as well as other sterol-containing metabolites such as cholesterol.

Fatty acids include, for example, eicosanoids, derived primarily from arachidonic acid and eicosapentaenoic acid, which include prostaglandins, leukotrienes, and thromboxanes. Other major lipid classes in the fatty acid category are the fatty esters and fatty amides. Fatty esters include important biochemical intermediates such as wax esters, fatty acid thioester coenzyme A derivatives, fatty acid thioester ACP derivatives and fatty acid carnitines. The fatty amides include N-acyl ethanolamines, Glycerolipids are composed mainly of mono-, di- and tri-substituted glycerols, such as, for example, the fatty acid esters of glycerol (triacylglycerols/triglycerides). Additional subclasses of glycerolipids are represented by glycosylglycerols, which contain one or more sugar residues attached to glycerol via a glycosidic linkage (e.g., digalactosyldiacylglycerols and seminolipids).

Glycerophospholipids may be subdivided into classes, based on the nature of the polar headgroup at the sn-3 position of the glycerol backbone in eukaryotes and eubacteria, or the sn-1 position in the case of Archaea. Non-limiting examples of glycerophospholipids include, for example, phosphatidylcholine, phosphatidylethanolamine, phosphatidylserine, phosphatidylinositols and phosphatidic acids.

Sterol lipids include, for example, cholesterol and its derivatives, glycerophospholipids, sphingomyelins, phytosterols (e.g., β-sitosterol, stigmasterol, and brassicasterol; the latter compound is also used as a biomarker for algal growth), and ergosterol.

Prenol lipids are synthesized from 5-carbon precursors, isopentenyl diphosphate and dimethylallyl diphosphate, which are produced mainly via the mevalonic acid (MVA) pathway. Isoprenoids (linear alcohols, diphosphates, etc.) are classified according to number of these terpene units. Isoprenoids (terpenoids) include, for example, hemiterpenoids, 1 isoprene unit (5 carbons); monoterpenoids, 2 isoprene units (10 carbons); sesquiterpenoids, 3 isoprene units (15 carbons); diterpenoids, 4 isoprene units (20 carbons); sesterterpenoids, 5 isoprene units (25 carbons); triterpenoids, 6 isoprene units (30 carbons); tetraterpenoids, 8 isoprene units (40 carbons) (e.g., carotenoids); and polyterpenoids having a larger number of isoprene units. Terpenoids can also be classified according to the number of cyclic structures they contain.

Saccharolipids are compounds in which fatty acids are linked directly to a sugar backbone, forming structures that are compatible with membrane bilayers. Saccharolipids include, for example, acylated glucosamine precursors of Lipid A.

Polyketides and derivatives thereof include, for example, erythromycins, tetracyclines, avermectins, and epothilones.

Carbohydrates (saccharides) are divided into four chemical groupings: monosaccharides, disaccharides, oligosaccharides, and polysaccharides. Monosaccharides include, for example aldoses, ketoses, trioses, tetroses, pentoses, hexoses, aldohexoses (e.g., glucose), aldohexoses (e.g., ribose), ketohexoses (e.g., fructose), etc. Disaccharides are two joined monosaccharides and include, for example, sucrose and lactose. Oligosaccharides and polysaccharides (e.g., starch, cellulose, chitin, callose, laminarin, chrysolaminarin, xylan, arabinoxylan, mannan, fucoidan, galactomannan, etc.) are composed of longer chains of monosaccharide units bound together by glycosidic bonds. Oligosaccharides generally contain between three and ten monosaccharide units, and polysaccharides contain greater than ten monosaccharide units.

The described methods can further include contacting a compound which has deuterated methoxy groups with either water or deuterium oxide; and measuring the relative amounts of each deuterated isotopomer of methane using mass spectrometry. In one embodiment, the deuterated isotopomers of methane comprise 1, 2, 3, or 4 deuterium atoms.

The equation used in the described methods, in its base form, is Y=g(X,A), wherein $Y=(f_{m/z=(m/z)i})n$, wherein $f_{m/z=(m/z)i}$ is the observed fractional m/s peak area for peak with mass to charge ratio $(m/z)_i$ and n is the total number of significant peaks in the m/s spectrum; $X=(f_{CHxDy})m$, wherein $f_{CHxDy}$ is the actual fraction of a given isotopomer with x hydrogen atoms and y deuterium atoms and m is the total number of isotopomers considered; g(X, A) is a function that relates the measured fractional M/S peak areas to the actual isotopomer fractions in the sample; and A are parameters estimated using calibration data with mixtures of known isotopomer fractions. In one embodiment, n is an integer between 1 and 1,000. In another embodiment, m is an integer between 1 and 1,000. It is to be understood that each compound to be analyzed using the described methods can be assessed with respect to these parameters.

The function g(X,A) can be a linear or nonlinear function and its form can be derived either by inspecting calibration data or through theoretical considerations. The simplest form of g(x,A) is a linear function g(X,A)=AX, where A is a matrix. Nonlinear functions g(X) include, for example higher order polynomials, exponential functions, rational functions, Gaussian functions, trigonometric functions, and spline functions. If g(X,A) is a linear function the components of matrix A can be estimated from calibration data using multivariate linear multiple regression. If function g(X,A) is a nonlinear function, it's parameters A can be estimated from calibration data using nonlinear multivariate multiple regression. The parameters A for both linear and non-linear functions g(X,A) can be estimated using conventional statistical software such as, for example, Excel, SAS, SPSS, R, Matlab, etc. The relationship between Y and X is inverted to determine the actual isotopomer fractions given the mass spectrometry peak areas in a test sample as $X=g^{-1}(Y)$ denotes the inverse function of g(X). In one embodiment, $g^{-1}=A^{-1}$ is a matrix inverse of matrix A and $A^{-1}$ is approximated by the pseudoinverse A* of the matrix A in order to obtain a best fit solution to X in a least squares sense.

In one embodiment, the hydrogen-containing compound is methane ($CH_4$) and the matrix equation is Y=AX, where $Y=(f_{m/z=20}, f_{m/z=19}, f_{m/z=18}, f_{m/z=17}, f_{m/z=16})$, $X=(f_{CH4}, f_{CH3D}, f_{CH2D2}, f_{CHD3}, f_{CD4})$; and A=a matrix that relates the measured fractions related to the actual fractions.

In another embodiment, the hydrogen-containing compound is ethane ($C_2H_6$) and the matrix equation is Y=g(X,A), where $Y=(f_{m/z=30}, f_{m/z=31}, f_{m/z=32}, f_{m/z=33}, f_{m/z}{}^{=34}, f_{m/z=35})$, $f_{m/z=36}$ $f_{m/z=37}$; $X=(f_{C2H6}, f_{C2H5D}, f_{C2H4D2}, f_{C2H}{}^{3D}{}_{3}, f^{C2}{}_{H2D4}, f_{C2HD5}, f_{C2D6})$; and g(X,A)=a function that relates the measured fraction related to the actual fractions and A are parameters In another embodiment, the hydrogen-containing compound is benzene ($C_6H_6$) and the matrix equation is Y=g(X, A), where $Y=(f_{m/z=78}, f_{m/z=79}, f_{m/z=80}, f_{m/z=81}, f_{m/z=82}, f_{m/z=83}, f_{m/z=84})$; $X=(f_{C6H6}, f_{C6H5D}, f_{C6H4D2}, f_{C6H3D3}, f_{C6H2D4}, f_{C6HD5}, f_{C6D6})$; and g(X,A)=a function that relates the measured fractions related to the actual fractions and A are parameters.

In yet another embodiment, the hydrogen-containing compound is naphthalene ($C_{10}H_8$) the matrix equation is Y=g(X, A), where $(f_{m/z=128}, f_{m/z=129}, f_{m/z=130}, f_{m/z=131}, f_{m/z=132}, f_{m/z=133}, f_{m/z=134}, f_{m/z=135}, f_{m/z=136},)$; $X=(f_{C10H8}, f_{C10H7D}, f_{C10H6D2}, f_{C10H5D3}, f_{C10H4D4}, f_{C10H3D5}, f_{C2H2D6}, f_{C2HD7}, f_{C2D8})$; and g(X,A)=a function that relates the measured fractions related to the actual fractions and A are parameters.

Initial experiments used mass spectrometry to assess the ratios of methane:deuterated methane, but there was interference identified between the peaks of interest. The invention methods were developed to address this interference and can be further applied to tracking the flow of hydrogen protons in any number of metabolic pathways.

The invention methods can also be used to measure rates of incorporation of hydrogen into a hydrocarbon product. In one non-limiting example, where a portion of the total of methane produced in a coalbed methane well is desorbed from the coal matrix (and thus would not be labeled) some of it is produced by microbial activity (and would be labeled if deuterated water is injected into the well). Thus, the described methods can be used to measure the incorporation of deuterated methoxy groups into methane.

While certain embodiments of the present invention have been shown and described herein and below in the examples, it will be obvious that such embodiments are provided by way of example only. Numerous variations, changes, and substitutions may now occur without departing from the invention. It should be understood that various alternatives to the embodiments of the invention described herein may be employed in practicing the invention.

EXAMPLES

The following examples are intended to illustrate but not limit the invention.

Example 1

Labeled Methane

GC-MS Analysis of Deuterium Incorporation into Methane

Deuterium incorporation into methane during a coalbed methane process was assessed by GC-MS by assessing each of the individual isotopomers of methane. The following compounds were monitored: methane ($CH_4$), $CH_3D$, $CH_2D_2$, $CHD_3$, and $CD_4$.

Reagents/Materials

Deuterated compounds (i.e., Methane $D_1$, Methane $D_2$, Methane $D_3$, and Methane $D_4$) were purchased from Cambridge Isotopes and methane was purchased from WestAir Gases. It is to be understood that comparable quality reagents or materials from other suppliers can be substituted.

Analytes and Background Compounds

| | Compound | | | | | | | |
|---|---|---|---|---|---|---|---|---|
| | $CH_4$ | $CH_3D$ | $CH_2D_2$ | $CH_3D$ | $CD_4$ | $N_2$ | $O_2$ | $H_2O$ |
| Molecular Weight (M.W.) | 16 | 17 | 18 | 19 | 20 | 28 | 32 | 18 |

Standard Stock Solutions

The pure deuterated compounds were diluted in helium (He) sparged vials at 1 mL in 160 mL vial; each sample was then diluted into 48 mL vial and a 13 mL vial. The $CH_4$ was diluted in vials to make 10%, 2.5%, 1.0%, and 0.25% methane in He.

Samples

Samples (1.0 mL) were collected in 13.0 mL of He.

Instrument and Analysis Conditions (GC-MS)

The results obtained in these experiments were performed on an Agilent 7890A gas chromatography system with an Agilent 5875C triple axis mass spectrometer. Experimental parameters were as follows: Flow: 1.9 mL/min He, constant flow control; Oven Temperature: 60° C.; Column: HP-5MS, 30 m×0.25 mm×25 μm; Inlet: 300° C., 16.549 psi, 23.4 mL/min total flow, split ratio 10:1, split flow 18.5 mL/min; MS Parameters: MS source, 230° C.; MS Quad 200° C., no solvent delay; mass range, 10 to 50 amu; SIM ions: 16.0, 17.0, 18.0, 19.0 and 20.0; Injection volume: manual injection of 1.0 mL; and Total Runtime: 4 minutes.

The retention time of the compounds was as follows:

| Compound | Approximate Retention Time |
|---|---|
| Nitrogen | 3.03 min |
| Methane | 3.23 min |
| Carbon dioxide | 3.75 min |
| Water | 3.75 min |

Retention times may vary between samples due to manual injection. FIG. 1 illustrates the retention times of nitrogen, methane and $CO_2/H_2O$, respectively, over time.

Standards with pure isotopomers were first run to generate a calibration table. Table 1 provides calibration data for each of the compounds tested. Each standard was run at various concentrations (i.e., % concentration). Headings refer to the compound, sample, concentration and amount of each mass observed. Each isotopomer has different ratios of masses.

TABLE 1

| Compound | Vial Conc. (%) | 20 Response | From curve m/z 20 (%) | 19 Response | From curve m/z 19 (%) | 18 Response | From curve m/z 18 (%) | 17 Response | From curve m/z 17 (%) | 16 Response | From curve m/z 16 (%) | Total (%) |
|---|---|---|---|---|---|---|---|---|---|---|---|---|
| $CH_4$ | 0.25 | 0.00 | 0.00 | 0.00 | 0.00 | 0.00 | 0.00 | 0.00 | 0.00 | 15392.65 | 0.20 | 0.20 |
| $CH_4$ | 1.25 | 0.00 | 0.00 | 0.00 | 0.00 | 0.00 | 0.00 | 0.00 | 0.00 | 46757.33 | 0.60 | 1 |
| $CH_4$ | 1.25 | 0.00 | 0.00 | 0.00 | 0.00 | 0.00 | 0.00 | 0.00 | 0.00 | 53473.35 | 0.69 | 1 |
| $CH_4$ | 1.25 | 0.00 | 0.00 | 0.00 | 0.00 | 0.00 | 0.00 | 0.00 | 0.00 | 60196.05 | 0.78 | 1 |
| $CH_4$ | 2.50 | 0.00 | 0.00 | 0.00 | 0.00 | 0.00 | 0.00 | 3220.43 | 0.05 | 116114.37 | 1.50 | 2 |
| $CH_4$ | 2.50 | 0.00 | 0.00 | 0.00 | 0.00 | 0.00 | 0.00 | 2305.10 | 0.03 | 175369.67 | 2.26 | 2 |
| $CH_4$ | 10.00 | 0.00 | 0.00 | 0.00 | 0.00 | 0.00 | 0.00 | 10745.00 | 0.15 | 771137.15 | 9.94 | 10 |
| $CH_4$ | 10.00 | 0.00 | 0.00 | 0.00 | 0.00 | 1535.93 | 0.02 | 12315.45 | 0.17 | 922380.55 | 11.89 | 12 |
| $CH_4$ | 10.00 | 0.00 | 0.00 | 0.00 | 0.00 | 0.00 | 0.00 | 9548.53 | 0.13 | 653879.98 | 8.43 | 9 |
| $CH_3D$ | 7.81 | 0.00 | 0.00 | 0.00 | 0.00 | 5627.45 | 0.08 | 416434.41 | 5.84 | 311890.08 | 4.02 | 10 |
| $CH_3D$ | 7.81 | 0.00 | 0.00 | 0.00 | 0.00 | 5142.90 | 0.07 | 375927.30 | 5.27 | 281997.98 | 3.63 | 9 |
| $CH_3D$ | 7.81 | 0.00 | 0.00 | 0.00 | 0.00 | 7340.20 | 0.10 | 533494.15 | 7.48 | 400797.08 | 5.16 | 13 |
| $CH_3D$ | 20.80 | 0.00 | 0.00 | 0.00 | 0.00 | 25217.50 | 0.35 | 1862210.35 | 26.13 | 1395552.73 | 17.98 | 44 |
| $CH_3D$ | 20.80 | 0.00 | 0.00 | 0.00 | 0.00 | 18112.33 | 0.25 | 1330388.85 | 18.66 | 997720.33 | 12.86 | 32 |
| $CH_3D$ | 20.80 | 0.00 | 0.00 | 0.00 | 0.00 | 18836.77 | 0.26 | 1390513.25 | 19.51 | 1042473.95 | 13.43 | 33 |
| $CH_3D$ | 1.67 | 0.00 | 0.00 | 0.00 | 0.00 | 0.00 | 0.00 | 115299.36 | 1.62 | 86471.35 | 1.11 | 3 |
| $CH_3D$ | 1.67 | 0.00 | 0.00 | 0.00 | 0.00 | 0.00 | 0.00 | 72375.19 | 1.02 | 54137.65 | 0.70 | 2 |
| $CH_2D_2$ | 7.81 | 0.00 | 0.00 | 10583.39 | 0.17 | 631079.75 | 8.83 | 414725.85 | 5.82 | 211152.20 | 2.72 | 18 |
| $CH_2D_2$ | 7.81 | 0.00 | 0.00 | 7502.95 | 0.12 | 446321.40 | 6.25 | 293000.51 | 4.11 | 149095.80 | 1.92 | 12 |
| $CH_2D_2$ | 20.80 | 0.00 | 0.00 | 22339.11 | 0.37 | 1317268.75 | 18.43 | 864726.10 | 12.13 | 440835.50 | 5.68 | 37 |
| $CH_2D_2$ | 20.80 | 0.00 | 0.00 | 30116.84 | 0.50 | 1758461.25 | 24.61 | 1156465.10 | 16.22 | 585590.08 | 7.55 | 49 |
| $CH_2D_2$ | 0.63 | 0.00 | 0.00 | 0.00 | 0.00 | 57143.80 | 0.80 | 37831.54 | 0.53 | 18954.32 | 0.24 | 2 |
| $CH_2D_2$ | 0.63 | 0.00 | 0.00 | 0.00 | 0.00 | 15381.05 | 0.22 | 7613.90 | 0.11 | 0.00 | 0.00 | 0 |
| $CH_2D_2$ | 0.63 | 0.00 | 0.00 | 0.00 | 0.00 | 37860.71 | 0.53 | 23197.30 | 0.33 | 9519.30 | 0.12 | 1 |
| $CHD_3$ | 7.81 | 2177.53 | 0.03 | 259482.30 | 4.27 | 110278.35 | 1.54 | 116211.69 | 1.63 | 33170.90 | 0.43 | 8 |
| $CHD_3$ | 7.81 | 3430.35 | 0.05 | 406678.79 | 6.70 | 172673.90 | 2.42 | 181656.83 | 2.55 | 52456.25 | 0.68 | 12 |
| $CHD_3$ | 7.81 | 3341.68 | 0.05 | 396166.93 | 6.53 | 167636.35 | 2.35 | 176042.20 | 2.47 | 51350.08 | 0.66 | 12 |
| $CHD_3$ | 20.80 | 11326.53 | 0.10 | 1321568.08 | 21.77 | 556146.33 | 7.78 | 586291.83 | 8.23 | 164798.38 | 2.12 | 40 |

TABLE 1-continued

| Compound | Vial Conc. (%) | 20 Response | From curve m/z 20 (%) | 19 Response | From curve m/z 19 (%) | 18 Response | From curve m/z 18 (%) | 17 Response | From curve m/z 17 (%) | 16 Response | From curve m/z 16 (%) | Total (%) |
|---|---|---|---|---|---|---|---|---|---|---|---|---|
| $CHD_3$ | 20.80 | 11087.48 | 0.16 | 1295201.95 | 21.33 | 545965.00 | 7.64 | 575175.13 | 8.07 | 159396.13 | 2.05 | 39 |
| $CHD_3$ | 0.63 | 0.00 | 0.00 | 19735.28 | 0.33 | 8565.20 | 0.12 | 8954.75 | 0.13 | 1823.85 | 0.02 | 1 |
| $CHD_3$ | 0.63 | 0.00 | 0.00 | 26134.85 | 0.43 | 11374.30 | 0.16 | 11828.60 | 0.17 | 3202.33 | 0.04 | 1 |
| $CD_4$ | 7.81 | 640810.45 | 5.40 | 10063.20 | 0.17 | 478754.92 | 6.70 | 3863.13 | 0.05 | 107256.10 | 1.38 | 14 |
| $CD_4$ | 7.81 | 736533.70 | 6.57 | 11710.30 | 0.19 | 551399.10 | 7.72 | 4408.25 | 0.06 | 126015.93 | 1.62 | 16 |
| $CD_4$ | 7.81 | 594177.15 | 5.27 | 9317.17 | 0.15 | 442446.20 | 6.19 | 3570.70 | 0.05 | 99277.15 | 1.28 | 13 |
| $CD_4$ | 20.80 | 687105.78 | 5.93 | 10987.56 | 0.18 | 515125.91 | 7.21 | 3998.27 | 0.06 | 166012.15 | 2.14 | 16 |
| $CD_4$ | 20.80 | 1110013.45 | 9.88 | 17278.26 | 0.28 | 821343.60 | 11.49 | 6397.60 | 0.09 | 187674.73 | 2.42 | 24 |
| $CD_4$ | 20.80 | 1721217.75 | 30.10 | 26715.44 | 0.82 | 1285705.40 | 22.74 | 9910.25 | 0.26 | 290364.73 | 12.79 | 67 |
| $CD_4$ | 20.80 | 1304461.55 | 18.62 | 20234.55 | 0.62 | 973765.10 | 15.77 | 7698.43 | 0.20 | 218851.50 | 8.87 | 44 |
| $CD_4$ | 0.63 | 21032.46 | 0.31 | 0.00 | 0.00 | 17548.03 | 0.29 | 0.00 | 0.00 | 4254.95 | 0.05 | 1 |
| $CD_4$ | 0.63 | 50226.40 | 0.73 | 0.00 | 0.00 | 37529.63 | 0.53 | 0.00 | 0.00 | 8228.85 | 0.11 | 1 |
| $CD_4$ | 0.63 | 39119.29 | 0.57 | 0.00 | 0.00 | 29323.00 | 0.41 | 0.00 | 0.00 | 6279.70 | 0.08 | 1 |

The calibration data allowed for the determination that the observed mass distribution depended approximately linearly on the actual isotopomer fractions in each sample. It is to be understood that the calibration tables can be developed for other compounds and the relative amounts of each isotopomer determined based on the ratios.

Based on this observation the following approach was developed to estimate the actual isotopomer fractions from the observed mass fractions.

Estimation of isotopomer fractions: Each of the ions was calibrated as if it was a pure compound and the calibration curve was forced through zero. Based on the calibration data, it was assumed that the measured fractional MS peak areas $Y=(f_{m/Z=20}, f_{m/Z=19}, f_{m/Z=18}, f_{m/Z=17}, f_{m/Z=16})$ are linearly related to the actual methane isotopomer fractions $X=(f_{CH4}, f_{CH3D}, f_{CH2D2}, f_{CHD3}, f_{CD4})$ in the sample. This relationship can be mathematically described as Y=AX, where A is a matrix that relates the measured fractions related to the actual fractions. The elements in matrix A were found by fitting a multivariate linear multiple regression model to the calibration data. In order to find the actual isotopomer fractions given the MS peak areas in a test (non-calibration sample) we invert the relationship between Y and X: $X=A^{-1}Y$, where $A^{-1}$ denotes a matrix inverse of matrix A. However, the matrix A is not exactly invertible, and a pseudo-inverse A* was used instead that gives the best fit solution for X in a least squares sense.

FIGS. 2-6 show the observed masses of $CH_4$, $CH_3D$, $CH_2D_2$, $CHD_3$ and $CD_4$, respectively at a single time point.

Samples were then tested and the inverse equation was used to determine the amount of fraction of each isotopomer in each sample.

Following calibration with the standards, experimental samples were tested: samples contained microorganisms known to produce methane. The method was used to measure the amount of deuterium from heavy water that microorganisms (methanogens) were able to incorporate into coalbed methane. Headspace samples were tested to confirm that methane was present.

Using the model described above, incorporation of deuterium into coalbed methane mediated by methanogens was determined by measuring individual species of isotopomers. Briefly, microbes obtained from a coalbed in the San Juan basin were enriched. The enriched microbes were cultured in the appropriate medium in the presence and absence of sterile coal, in the presence and absence of yeast extract, and with $H_2O$ or $D_2O$.

Reagents

Stock C: 50 mL solution of 2.4 g $NaHCO_3$ in milliQ water.

Mod A: 50 mL solution containing 6 g NaCl, 2 g $MgCl_2$, 0.1 g $CaCl_2$, 1.5 g $NH_4Cl$ and 1.5 g KCl in milliQ water.

Stock B: 100 mL of milliQ water containing 1 g $K_2HPO_4$.

DM base: 910 milliQ water, 50 mL Stock C, and 10 mL mod A; after mixing, the Durango medium (DM) base is sparged for 20 minutes with an 80:20 mixture of $N_2/CO_2$.

$N_2$ base: 918 mL milliQ water and 10 mL mod A; after mixing, the $N_2$ base is sparged for 20 minutes with 100% $N_2$.

Vitamin/trace elements: 200 g/L $Na_2S$ was made as 5 g/L sulfide diluted with $D_2O$.

Yeast extract (YE): a 25 g/L yeast extract was prepared by diluting 1.25 g YE in 50 mL milliQ water. A second solution of 6.25 g/L YE was prepared by diluting 5 mL of the 25 g/L YE with 15 mL $D_2O$.

Experimental Protocol

Eight 32-tube experiments were set up; each experiment had four replicates of Durango medium (DM), DM with sterile coal (DMSC), DMSC+0.5 g/L yeast extract, DMSC+0.25 g/L yeast extract, or DMSC+0.125 g/L yeast extract.

Using a dispenser, 7.5 mL of DM base or 7.5 mL of $N_2$ base were added to the tubes. Each tube was sparged for 5 minutes with the respective gas, capped and autoclaved.

Master mixes were prepared using 5X DM Base, trace elements, vitamin solution, 10 g/L of stock B, 25 g/L yeast extract or 6.25 g/L yeast extract, and milliQ water. All master mixes were prepared in the correct headspace gas for each control and experimental condition to be tested and were added to the tubes.

A microbial community inoculum was prepared by extracting 140 mL of liquid from the 2L-245B upflow reactor. The liquid was poured into four 35-mL aliquots, centrifuged at 10° C. for 10 minutes at 10,000 RPM, resuspending the pellet in DM+B+sulfide (all 1X).

The four solutions tested were $H_2O/N_2$, $H_2O/CO_2$, $D_2O/N_2$ and $D_2O/CO_2$. The resuspended pellets were transferred to anaerobic sterile serum bottles and used as inoculum; 0.5 mL sulfide (either $D_2O$ or $H_2O$) and 1.0 mL of inoculum were added to the bottles.

Of the 32 tubes, 16 contained sterile coal and 16 did not. Autoclaved $N_2/H_2O$ DM base (7.5 mL) was added to each tube. One (1) mL of the master mixes described above was added to each tube; and 0.5 mL of the 5 g/L $Na_2S$ solution and 1 mL of the inoculum were added to the tubes.

Optical density (OD) readings were conducted on each inoculum to confirm that microbes were present.

Headspace gas was obtained from the cultures and GC-mass spectrometry was used to assess each of the individual species of isotopomers as described above. Isotopomers were measured at various levels in the $D_2O$ samples as shown below in Table 2.

TABLE 2

Sample Ratio Table.
The table provides the sample, sample number, the amount of each m/z (observed masses) for each sample.

| Sample | Sample # | m/z 20 | m/z 19 | m/z 18 | m/z 17 |
|---|---|---|---|---|---|
| SAMPLE-05.D | 5 | 30.48 | 11.43 | 41.90 | 5.71 |
| SAMPLE-06.D | 6 | 30.58 | 10.74 | 42.15 | 5.79 |
| SAMPLE-07.D | 7 | 31.11 | 10.00 | 42.22 | 5.56 |
| SAMPLE-08A.D | 8 | 29.85 | 10.45 | 41.79 | 5.97 |
| SAMPLE-09.D | 9 | 28.00 | 12.00 | 42.00 | 0.01 |
| SAMPLE-10.D | 10 | 30.49 | 10.98 | 41.46 | 6.10 |
| SAMPLE-11.D | 11 | 29.27 | 10.98 | 42.68 | 6.08 |
| SAMPLE-12.D | 12 | 40.78 | 9.71 | 34.95 | 4.85 |
| SAMPLE-13.D | 13 | 50.00 | 0.00 | 50.00 | 0.00 |
| SAMPLE-15.D | 15 | 50.00 | 0.00 | 40.00 | 0.00 |
| SAMPLE-21.D | 21 | 22.42 | 16.06 | 36.82 | 12.12 |
| SAMPLE-22.D | 22 | 32.69 | 14.04 | 31.72 | 10.65 |
| SAMPLE-23.D | 23 | 32.76 | 13.97 | 31.73 | 10.65 |
| SAMPLE-24A.D | 24 | 50.00 | 0.00 | 50.00 | 0.00 |
| SAMPLE-25.D | 25 | 25.63 | 12.03 | 26.27 | 24.38 |
| SAMPLE-26.D | 26 | 31.25 | 12.50 | 31.25 | 12.50 |
| SAMPLE-27.D | 27 | 31.23 | 13.33 | 30.53 | 12.63 |
| SAMPLE-28.D | 28 | 30.63 | 13.51 | 30.63 | 12.61 |
| SAMPLE-29A.D | 29 | 29.31 | 12.64 | 29.31 | 14.94 |
| SAMPLE-30.D | 30 | 29.58 | 12.68 | 29.58 | 14.08 |
| SAMPLE-31.D | 31 | 28.57 | 12.5 | 28.57 | 16.07 |
| SAMPLE-32.D | 32 | 28.26 | 13.04 | 30.43 | 15.22 |
| SAMPLE-37.D | 37 | 38.71 | 9.68 | 51.61 | 0.00 |
| SAMPLE-38.D | 38 | 42.16 | 9.80 | 34.31 | 4.90 |
| SAMPLE-39.D | 39 | 50.00 | 0.00 | 50.00 | 0.00 |
| SAMPLE-40.D | 40 | 50.00 | 0.00 | 50.00 | 0.00 |
| SAMPLE-41.D | 41 | 50.00 | 0.00 | 50.00 | 0.00 |
| SAMPLE-42.D | 42 | 40.96 | 9.64 | 33.73 | 6.02 |
| SAMPLE-43.D | 43 | 40.00 | 10.00 | 34.00 | 6.00 |
| SAMPLE-44.D | 44 | 41.54 | 9.23 | 33.85 | 6.15 |
| SAMPLE-45.D | 45 | 62.50 | 0.00 | 37.50 | 0.00 |
| SAMPLE-46.D | 46 | 45.45 | 9.09 | 36.36 | 0.00 |
| SAMPLE-47A.D | 47 | 41.46 | 9.76 | 34.15 | 4.88 |
| SAMPLE-48B.D | 48 | 41.67 | 25.00 | 33.33 | 0.00 |
| SAMPLE-53.D | 53 | 38.05 | 12.85 | 33.42 | 7.20 |
| SAMPLE-54.D | 54 | 38.38 | 12.68 | 33.45 | 7.04 |
| SAMPLE-55.D | 55 | 39.26 | 12.27 | 33.74 | 6.75 |
| SAMPLE-56.D | 56 | 38.89 | 12.50 | 33.68 | 6.60 |
| SAMPLE-57.D | 57 | 37.50 | 12.50 | 37.50 | 0.00 |
| SAMPLE-58.D | 58 | 46.15 | 15.38 | 38.46 | 0.00 |
| SAMPLE-59.D | 59 | 36.99 | 13.01 | 32.88 | 8.22 |
| SAMPLE-60.D | 60 | 36.21 | 13.79 | 32.76 | 8.62 |
| SAMPLE-61A.D | 61 | 28.42 | 14.75 | 37.89 | 18.95 |
| SAMPLE-62.D | 62 | 36.89 | 13.11 | 32.79 | 9.02 |
| SAMPLE-63.D | 63 | 34.78 | 13.04 | 32.61 | 10.14 |
| SAMPLE-64.D | 64 | 29.17 | 44.44 | 12.5 | 13.89 |
| SAMPLE-69.D | 69 | 0.00 | 0.00 | 0.00 | 1.37 |
| SAMPLE-70.D | 70 | 0.00 | 0.00 | 0.00 | 1.72 |
| SAMPLE-71.D | 71 | 0.00 | 0.00 | 0.00 | 1.60 |
| SAMPLE-72.D | 72 | 0.00 | 0.00 | 0.00 | 1.65 |
| SAMPLE-73.D | 73 | 0.00 | 0.00 | 0.00 | 0.00 |
| SAMPLE-74.D | 74 | 0.00 | 0.00 | 0.00 | 0.00 |
| SAMPLE-75.D | 75 | 0.00 | 0.00 | 0.00 | 0.00 |
| SAMPLE-76.D | 76 | 0.00 | 0.00 | 0.00 | 0.00 |
| SAMPLE-77.D | 77 | 0.00 | 0.00 | 0.00 | 0.00 |
| SAMPLE-78.D | 78 | 0.00 | 0.00 | 0.00 | 0.00 |
| SAMPLE-79A.D | 79 | 0.00 | 0.00 | 0.00 | 0.00 |
| SAMPLE-80.D | 80 | 0.00 | 0.00 | 0.00 | 0.00 |
| SAMPLE-81.D | 81 | 0.00 | 0.00 | 0.00 | 0.00 |
| SAMPLE-82.D | 82 | 0.00 | 0.00 | 0.00 | 0.00 |
| SAMPLE-83.D | 83 | 0.00 | 0.00 | 0.00 | 0.00 |
| SAMPLE-84.D | 84 | 0.00 | 0.00 | 0.00 | 0.00 |
| SAMPLE-85.D | 85 | 0.00 | 0.00 | 0.00 | 1.49 |
| SAMPLE-86.D | 86 | 0.00 | 0.00 | 0.00 | 1.42 |
| SAMPLE-87.D | 87 | 0.00 | 0.00 | 0.00 | 1.65 |
| SAMPLE-88A.D | 88 | 0.00 | 0.00 | 0.00 | 0.00 |

TABLE 2-continued

Sample Ratio Table.
The table provides the sample, sample number, the amount of each m/z (observed masses) for each sample.

| Sample | Sample # | m/z 20 | m/z 19 | m/z 18 | m/z 17 |
|---|---|---|---|---|---|
| SAMPLE-89A.D | 89 | 0.00 | 0.00 | 0.00 | 0.00 |
| SAMPLE-90.D | 90 | 0.00 | 0.00 | 0.00 | 0.00 |
| SAMPLE-91.D | 91 | 0.00 | 0.00 | 0.00 | 0.00 |
| SAMPLE-92.D | 92 | 0.00 | 0.00 | 0.00 | 0.00 |
| SAMPLE-93.D | 93 | 0.00 | 0.00 | 0.00 | 0.00 |
| SAMPLE-94.D | 94 | 0.00 | 0.00 | 0.00 | 0.00 |
| SAMPLE-95.D | 95 | 0.00 | 0.00 | 0.00 | 0.00 |
| SAMPLE-96.D | 96 | 0.00 | 0.00 | 0.00 | 0.00 |
| SAMPLE-101A.D | 101 | 0.00 | 0.00 | 0.00 | 1.56 |
| SAMPLE-102.D | 102 | 0.00 | 0.00 | 0.00 | 1.34 |
| SAMPLE-103.D | 103 | 0.00 | 0.00 | 0.00 | 1.24 |
| SAMPLE-104.D | 104 | 0.00 | 0.00 | 0.00 | 1.75 |
| SAMPLE-105.D | 105 | 0.00 | 0.00 | 0.00 | 0 |
| SAMPLE-106.D | 106 | 0.00 | 0.00 | 0.00 | 0 |
| SAMPLE-107B.D | 107 | 0.00 | 0.00 | 0.00 | 0.00 |
| SAMPLE-108.D | 108 | 0.00 | 0.00 | 0.00 | 0.00 |
| SAMPLE-109.D | 109 | 0.00 | 0.00 | 0.00 | 0.00 |
| SAMPLE-110.D | 110 | 0.00 | 0.00 | 0.00 | 0.00 |
| SAMPLE-111.D | 111 | 0.00 | 0.00 | 0.00 | 0.00 |
| SAMPLE-112.D | 112 | 0.00 | 0.00 | 0.00 | 0.00 |
| SAMPLE-114B.D | 114 | 0.00 | 0.00 | 0.00 | 0.00 |
| SAMPLE-115.D | 115 | 0.00 | 0.00 | 0.00 | 0.00 |
| SAMPLE-117.D | 117 | 0.00 | 0.00 | 0.00 | 0.00 |
| SAMPLE-119B.D | 119 | 0.00 | 0.00 | 0.00 | 0.00 |
| SAMPLE-120.D | 120 | 0.00 | 0.00 | 0.00 | 1.45 |
| SAMPLE-121.D | 121 | 0.00 | 0.00 | 0.00 | 0.00 |
| SAMPLE-122B.D | 122 | 0.00 | 0.00 | 0.00 | 0.00 |
| SAMPLE-123.D | 123 | 0.00 | 0.00 | 0.00 | 0.00 |
| SAMPLE-124.D | 124 | 0.00 | 0.00 | 0.00 | 0.00 |
| SAMPLE-125B.D | 125 | 0.00 | 0.00 | 0.00 | 0.00 |
| SAMPLE-126.D | 126 | 0.00 | 0.00 | 0.00 | 0.00 |
| SAMPLE-127.D | 127 | 0.00 | 0.00 | 0.00 | 0.00 |
| SAMPLE-128.D | 128 | 0.00 | 0.00 | 0.00 | 0.00 |

The equation above was used to translate the observed ratios in Table 2 to the relative amount of each isotopomer species identified in Table 3.

TABLE 3

Sample Mass Table

| Sample # | $CH_4$ | $CH_3D$ | $CH_2D_2$ | $CHD_3$ | $CD_4$ | Total |
|---|---|---|---|---|---|---|
| 5 | 2.15 | −6.61 | 15.82 | 19.82 | 68.83 | 100 |
| 6 | 2.30 | −6.46 | 16.55 | 18.55 | 69.07 | 100 |
| 7 | 2.53 | −6.18 | 16.21 | 17.16 | 70.28 | 100 |
| 8 | 3.62 | −6.45 | 17.40 | 18.02 | 67.43 | 100 |
| 9 | 4.70 | −8.98 | 20.14 | 20.92 | 63.22 | 100 |
| 10 | 2.25 | −5.35 | 15.25 | 18.99 | 68.86 | 100 |
| 11 | 3.04 | −7.92 | 19.80 | 18.99 | 66.10 | 100 |
| 12 | −4.24 | 10.55 | −15.06 | 16.60 | 92.15 | 100 |
| 13 | −13.02 | −1.45 | 3.15 | −1.81 | 113.13 | 100 |
| 15 | −4.79 | 9.07 | −15.80 | −1.61 | 113.13 | 100 |
| 21 | 2.95 | 0.15 | 17.71 | 28.62 | 50.56 | 100 |
| 22 | −3.59 | 14.35 | −9.38 | 24.82 | 73.80 | 100 |
| 23 | −3.64 | 14.43 | −9.45 | 24.70 | 73.97 | 100 |
| 24 | −13.02 | −1.45 | 3.15 | −1.81 | 113.13 | 100 |
| 25 | −10.46 | 36.98 | −5.70 | 21.32 | 57.86 | 100 |
| 26 | −2.86 | 16.93 | −6.64 | 22.00 | 70.57 | 100 |
| 27 | −3.22 | 17.68 | −8.53 | 23.56 | 70.51 | 100 |
| 28 | −2.55 | 16.86 | −7.36 | 23.90 | 69.15 | 100 |
| 29 | −2.74 | 21.12 | −6.90 | 22.34 | 66.18 | 100 |
| 30 | −1.90 | 19.63 | −6.89 | 22.39 | 66.78 | 100 |
| 31 | −2.85 | 23.12 | −6.87 | 22.10 | 64.51 | 100 |
| 32 | −2.95 | 19.21 | −3.12 | 23.07 | 63.80 | 100 |
| 37 | −6.54 | −17.60 | 20.41 | 16.25 | 87.48 | 100 |
| 38 | −5.92 | 12.74 | −18.86 | 16.77 | 95.27 | 100 |
| 39 | −13.02 | −1.45 | 3.15 | −1.81 | 113.13 | 100 |
| 40 | −13.02 | −1.45 | 3.15 | −1.81 | 113.13 | 100 |
| 41 | −13.02 | −1.45 | 3.15 | −1.81 | 113.13 | 100 |
| 42 | −5.46 | 14.08 | −17.69 | 16.50 | 92.58 | 100 |

TABLE 3-continued

| Sample Mass Table | | | | | | |
|---|---|---|---|---|---|---|
| Sample # | $CH_4$ | $CH_3D$ | $CH_2D_2$ | $CHD_3$ | $CD_4$ | Total |
| 43 | −4.55 | 12.64 | −15.66 | 17.18 | 90.39 | 100 |
| 44 | −6.25 | 14.90 | −18.26 | 15.73 | 93.88 | 100 |
| 45 | −21.12 | 24.92 | −43.44 | −1.77 | 141.41 | 100 |
| 46 | −3.38 | 5.73 | −20.45 | 15.36 | 102.74 | 100 |
| 47 | −4.67 | 12.15 | −17.88 | 16.70 | 93.71 | 100 |
| 48 | −9.79 | 0.78 | −29.90 | 44.92 | 94.00 | 100 |
| 53 | −5.85 | 12.53 | −15.11 | 22.50 | 85.94 | 100 |
| 54 | −5.94 | 12.62 | −15.54 | 22.17 | 86.70 | 100 |
| 55 | −6.61 | 12.85 | −16.33 | 21.39 | 88.70 | 100 |
| 56 | −5.95 | 12.19 | −15.91 | 21.83 | 87.85 | 100 |
| 57 | 4.29 | −4.76 | −6.01 | 21.77 | 84.71 | 100 |
| 58 | −11.87 | 2.63 | −21.97 | 26.95 | 104.26 | 100 |
| 59 | −5.75 | 13.71 | −14.33 | 22.82 | 83.54 | 100 |
| 60 | −5.90 | 13.51 | −13.65 | 24.28 | 81.77 | 100 |
| 61 | −17.29 | 17.57 | 9.52 | 26.06 | 64.14 | 100 |
| 62 | −6.99 | 15.06 | −14.39 | 23.02 | 83.31 | 100 |
| 63 | −5.62 | 15.00 | −10.85 | 22.92 | 78.55 | 100 |
| 64 | −15.82 | 28.57 | −59.76 | 81.52 | 65.50 | 100 |
| 69 | 99.37 | 0.67 | −0.04 | 0.00 | 0.00 | 100 |
| 70 | 98.76 | 1.29 | −0.05 | 0.00 | 0.00 | 100 |
| 71 | 98.98 | 1.07 | −0.05 | 0.00 | 0.00 | 100 |
| 72 | 98.89 | 1.16 | −0.05 | 0.00 | 0.00 | 100 |
| 73 | 101.72 | −1.71 | −0.02 | 0.00 | 0.00 | 100 |
| 74 | 101.72 | −1.71 | −0.02 | 0.00 | 0.00 | 100 |
| 75 | 101.72 | −1.71 | −0.02 | 0.00 | 0.00 | 100 |
| 76 | 101.72 | −1.71 | −0.02 | 0.00 | 0.00 | 100 |
| 77 | 101.72 | −1.71 | −0.02 | 0.00 | 0.00 | 100 |
| 78 | 101.72 | −1.71 | −0.02 | 0.00 | 0.00 | 100 |
| 79 | 101.72 | −1.71 | −0.02 | 0.00 | 0.00 | 100 |
| 80 | 101.72 | −1.71 | −0.02 | 0.00 | 0.00 | 100 |
| 81 | 101.72 | −1.71 | −0.02 | 0.00 | 0.00 | 100 |
| 82 | 101.72 | −1.71 | −0.02 | 0.00 | 0.00 | 100 |
| 83 | 101.72 | −1.71 | −0.02 | 0.00 | 0.00 | 100 |
| 84 | 101.72 | −1.71 | −0.02 | 0.00 | 0.00 | 100 |
| 85 | 99.17 | 0.87 | −0.04 | 0.00 | 0.00 | 100 |
| 86 | 99.28 | 0.76 | −0.04 | 0.00 | 0.00 | 100 |
| 87 | 98.89 | 1.15 | −0.05 | 0.00 | 0.00 | 100 |
| 88 | 101.72 | −1.71 | −0.02 | 0.00 | 0.00 | 100 |
| 89 | 101.72 | −1.71 | −0.02 | 0.00 | 0.00 | 100 |
| 90 | 101.72 | −1.71 | −0.02 | 0.00 | 0.00 | 100 |
| 91 | 101.72 | −1.71 | −0.02 | 0.00 | 0.00 | 100 |
| 92 | 101.72 | −1.71 | −0.02 | 0.00 | 0.00 | 100 |
| 93 | 101.72 | −1.71 | −0.02 | 0.00 | 0.00 | 100 |
| 94 | 101.72 | −1.71 | −0.02 | 0.00 | 0.00 | 100 |
| 95 | 101.72 | −1.71 | −0.02 | 0.00 | 0.00 | 100 |
| 96 | 101.72 | −1.71 | −0.02 | 0.00 | 0.00 | 100 |
| 101 | 99.05 | 1.00 | −0.05 | 0.00 | 0.00 | 100 |
| 102 | 99.42 | 0.62 | −0.04 | 0.00 | 0.00 | 100 |
| 103 | 99.59 | 0.45 | −0.04 | 0.00 | 0.00 | 100 |
| 104 | 98.72 | 1.33 | −0.05 | 0.00 | 0.00 | 100 |
| 105 | 101.72 | −1.71 | −0.02 | 0.00 | 0.00 | 100 |
| 106 | 101.72 | −1.71 | −0.02 | 0.00 | 0.00 | 100 |
| 107 | 101.72 | −1.71 | −0.02 | 0.00 | 0.00 | 100 |
| 108 | 101.72 | −1.71 | −0.02 | 0.00 | 0.00 | 100 |
| 109 | 101.72 | −1.71 | −0.02 | 0.00 | 0.00 | 100 |
| 110 | 101.72 | −1.71 | −0.02 | 0.00 | 0.00 | 100 |
| 111 | 101.72 | −1.71 | −0.02 | 0.00 | 0.00 | 100 |
| 112 | 101.72 | −1.71 | −0.02 | 0.00 | 0.00 | 100 |
| 114 | 101.72 | −1.71 | −0.02 | 0.00 | 0.00 | 100 |
| 115 | 101.72 | −1.71 | −0.02 | 0.00 | 0.00 | 100 |
| 117 | 101.72 | −1.71 | −0.02 | 0.00 | 0.00 | 100 |
| 119 | 101.72 | −1.71 | −0.02 | 0.00 | 0.00 | 100 |
| 120 | 99.23 | 0.81 | −0.04 | 0.00 | 0.00 | 100 |
| 121 | 101.72 | −1.71 | −0.02 | 0.00 | 0.00 | 100 |
| 122 | 101.72 | −1.71 | −0.02 | 0.00 | 0.00 | 100 |
| 123 | 101.72 | −1.71 | −0.02 | 0.00 | 0.00 | 100 |
| 124 | 101.72 | −1.71 | −0.02 | 0.00 | 0.00 | 100 |
| 125 | 101.72 | −1.71 | −0.02 | 0.00 | 0.00 | 100 |
| 126 | 101.72 | −1.71 | −0.02 | 0.00 | 0.00 | 100 |
| 127 | 101.72 | −1.71 | −0.02 | 0.00 | 0.00 | 100 |
| 128 | 101.72 | −1.71 | −0.02 | 0.00 | 0.00 | 100 |

The results were obtained by measuring the levels of each species of isotopomers at a given time point using mass spectrometry.

Figure 7:
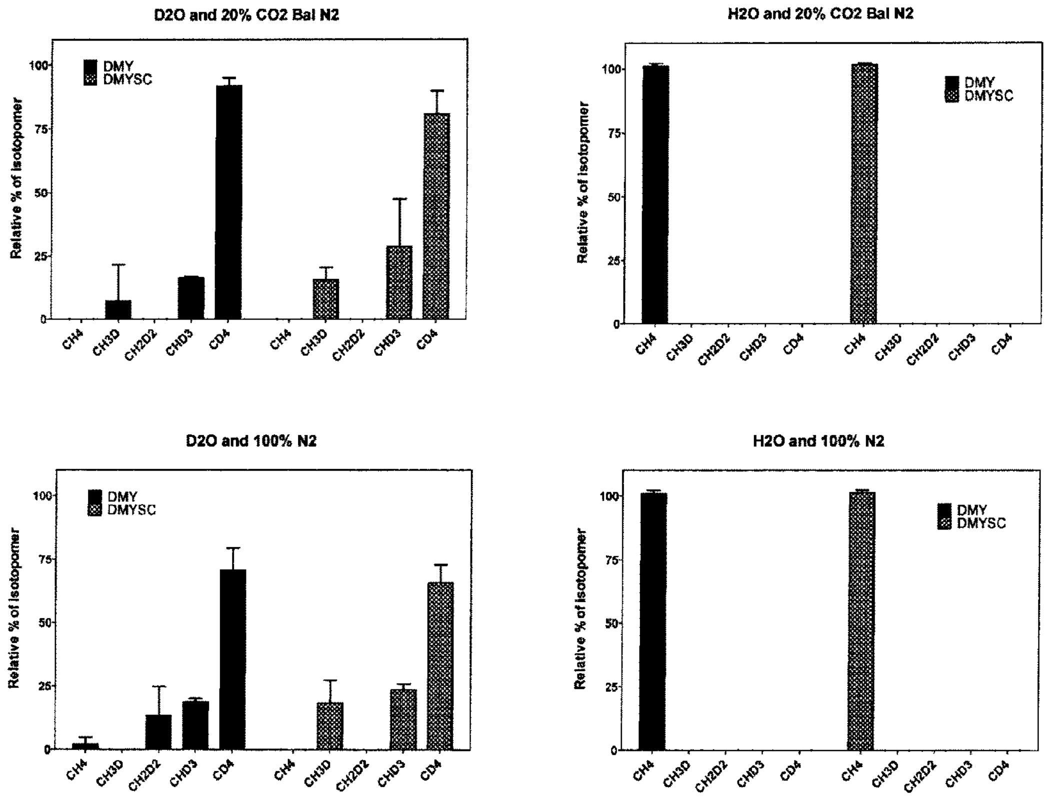
FIG. 7 demonstrates incorporation of deuterium into methane by methanogens by identification of individual species of isotopomers.

The results of this assessment are provided in FIG. 7. $CD_4$ levels were statistically significant under both atmospheres. As expected, $CH_3D$, $CH_2D_2$, $CHD_3$ and $CD_4$ were not observed in the absence of deuterium oxide ($D_2O$). Slightly more $CD_4$ was observed in DMY samples compared to DMYSC, although not statistically different. These results demonstrate that methane is being produced biogenically from coal.

These experiments looked exclusively at the parent masses of the isotopomers (m/z=16, 17, 18, 19, and 20). It is to be understood that adjustments can be made to the MS scan parameters so that each of the daughter fragment masses of $CH_4$ (m/z=13, 14, and 15) can used for the quantitation.

Example 2

Assessing Algal Production of Branched-chain Alcohols

As described in U.S. Publication No. 2009-0288337-A1, entitled "Methylbutanol as an Advanced Biofuel," enhanced production of branched-chain alcohols in strains of *Synechocystis* sp. was observed following overexpression of an acetolactate synthase gene.

Briefly, as described in that application publication, a 1.6-kbp DNA fragment comprising the coding region of the acetolactate synthase gene from *Synechocystis* sp. PCC 6803 (ilvB, Cyanobase gene designation sll1981) was amplified from genomic DNA using PCR with primers ilvB-5 (SEQ ID NO: 1) and ilvB-3 (SEQ ID NO: 2). This PCR fragment was digested with the restriction enzyme PciI and BglII and the ilvB gene coding region was then inserted into the expression cassette of pSGI-BL27 between the NcoI site and BglII site to yield pSGI-BL34. The expression cassette comprising the trc promoter, the ilvB coding sequence and the rps14 terminator is provided as SEQ ID NO: 3.

The pSGI-BL34 vector was transformed into wild-type *Synechocystis* sp. PCC 6803 to form strain SGC-BL34-1 and into *Synechocystis* sp. strain pSGI-BL23-1 to form strain SGC-BL23-34-1 according to the methods of Zang et al., *J. Microbiology* (2007) 45: 241-245. Insertion of the ilvB gene expression cassette into the "RS2" recombination site (Aoki, et al., *J. Bacteriol* (1995) 177: 5606-5611) through homologous recombination was confirmed by PCR screening of insert and insertion site.

For assessment in the present methods, the strains would then be grown in liquid BG-11 medium in the presence and absence of $D_2O$ and tested for the production of branched chain alcohols. All liquid medium growth conditions will use a rotary shaker (150 rpm) at 30° C. with constant illumination (60 μE·m-2·sec-1). Cultures are inoculated in 25 mL of BG-11 medium containing spectinomycin (10 μg/mL) and/or kanamycin (5 μg/mL) accordingly and grown to a sufficient density (minimal OD730 nm=1.6-2.0). Cultures are then used to inoculate 100 mL BG-11 medium in 250 mL polycarbonate flasks to OD730 nm=0.4-0.5 and incubated overnight. 45 mL of overnight culture at OD730 nm=0.5-0.6 are added to new 250-mL flasks, some of which are induced with 1 mM IPTG. 2 mL samples are taken at 0, 48, 96 and 144 hours post induction and processed as described in Example 2 of U.S. Publication No. 2009-0288337-A1.

A calibration table is prepared for each isotopomer standard for each branched chain alcohol.

Briefly, 2-methyl-1-butanol and 3-methyl-1-butanol are separated from the culture supernatant by liquid-liquid extraction (1 volume culture supernatant to 2 volumes of $CH_2Cl_2$) for gas chromatography-mass spectrometry analysis. A 1 μL sample is injected at a 20:1 split ratio onto an Rtx-624 column (Restek, 20 m×180 μm×1 μm), which is equilibrated for 0.5 min and then operated using the following temperature gradient: 70° C. for 1 min, 10° C./min to 110° C. for 0.5 min and then 20° C./min to 140° C. for 0.5 min, 7.5 min run time at 140° C., and 2 min post run time at 200° C. (0.75 mL/min He).

For isobutanol analysis, the culture supernatant is passed through 0.2 μm PVDF filter and then analyzed directly by gas chromatography using flame ionization detection. An HP-Innowax column (Agilent, 15 m×250 μm×0.25 μm) is equilibrated for 0.5 min and then operated using the following temperature gradient: 35° C. for 2 min, 25° C./min to 180° C. for 0.2 min, 8 min run time and 2 min post run time at 220° C. (0.75 mL/min He). A 1 μL sample is injected at a 40:1 split ratio with a 250° C. injection port temperature.

The equation described above is applied to relate the ratio of observed mass distributions of the standard isotopomers to the relative amounts of each standard isotopomer in the sample and the equation is applied to the ratio of masses identified in a sample to quantitate the relative amount of each isotopomer of each branched chain alcohol.

What is claimed is:

1. A method of quantitating isotopomers of a hydrogen-containing compound, comprising the steps of:

a) creating a calibration table of ratio of masses for standard isotopomers using a mass spectrometer;

b) relating in an equation the ratio of observed mass distributions of standard isotopomers to the relative amounts of each isotopomer in a sample; and c) applying the equation to the ratio of masses identified in the sample to quantitate the relative amount of each isotopomer of the hydrogen-containing compound;

wherein the equation is:

$Y=g(X,A)$, wherein $Y=(f_{m/z=(m/z)i})n$, wherein $f_{m/z=(m/z)i}$ is the observed fractional mass spectral mass spectrum peak area for peak with mass to charge ratio $m/z_i$ and n is the total number of significant peaks in the mass spectrum; i is the number of charge to mass ratios m/z; and g(X,A) is a function that relates the measured fractional m/s peak areas to the actual isotopomer fractions in the sample; wherein A is a parameter that can be determined by fitting function g(X,A) to calibration data; and $X=(f_{CHxDy})m$, wherein $f_{CHxDy}$ is the actual fraction of a given isotopomer with x hydrogen atoms and y deuterium atoms and m is the total number of isotopomers considered.

2. The method of claim 1, wherein the isotopomer contains one or more deuterium atoms.

3. The method of claim 1, further comprising:

a. contacting a hydrogen-deficient compound with a solution comprising deuterium oxide ($D_2O$); and b. quantitating the relative amounts of each isotopomer of a product compound according to claim 1 in order to measure the amount of deuterium incorporation into the hydrogen-containing compound.

4. The method of claim 1, further comprising a. contacting a hydrogen-deficient compound with a solution comprising $D_2$; and b. quantitating the relative amounts of each isotopomer of a product compound according to claim 1 in order to measure the amount of deuterium incorporation into the hydrogen-containing compound.

5. The method of claim 1, wherein the isotopomers of the compound comprise 0, 1, 2, 3, 4 or more deuterium atoms.

6. The method of claim 1, wherein the compound comprises 0, 1, 2, 3, 4, 5, 6, 7, 8, 9, 10, 11, 12, 13, 14, 15, 16, 17, 18, 19, 20 or more hydrogen atoms.

7. The method of claim 1, wherein the compound is a linear, cyclic or branched compound.

8. The method of claim 1, wherein the compound is a hydrocarbon.

9. The method of claim 8, wherein the hydrocarbon is an alkane, an alkene, or an aromatic compound.

10. The method of claim 9, wherein the alkane is methane, ethane, propane, n-butane, 2-methylbutane, isobutane, cyclobutane, pentane, isopentane (2-methylbutane), neopentane (2,2-dimethylpropane), cyclopentane, hexane, 3-methylhexane, heptane, octane, nonane, decane, hexadecane, or iso-octane, or the like.

11. The method of claim 9, wherein the alkene is ethylene, butene, butadiene, pentene, hexene, polyethylene, polypropylene, or polybutadiene.

12. The method of claim 9, wherein the aromatic compound is benzene or a derivative thereof, furan, pyridine, toluene, benzoic acid, naphthalene, anthracene, tetracene, pentacene, phenanthrene, triphenylene, or a polyaromatic hydrocarbon (PAH).

13. The method of claim 12, wherein the PAH is naphthalene, tetracene, phenanthrene, Benzy[a]pyrene, anthracene, chrysene, pentacene, acenaphthene, acenaphthylene, phenanthrene, fluorene, fluoranthene, benzo(a)anthracene, pyrene, benzo[b]fluoranthene, benzo[k]fluoranthene, dibenz[a,h]anthracene, benzo[g,h,i]perylene, or indeno[1,2,3-cd]pyrene.

14. The method of claim 9, wherein the aromatic compound comprises from 1 to about 50 rings.

15. The method of claim 9, wherein the aromatic compound is up to a $C_{100}$ compound.

16. The method of claim 3 or 4, wherein the hydrogen-deficient compound is part of a mixture of compounds found in a hydrocarbon material.

17. The method of claim 16, wherein the hydrocarbon material is coal, gasoline, oil, jet fuel, or diesel.

18. The method of claim 1, wherein the hydrogen-containing compound is an alcohol, a lipid, or a carbohydrate.

19. The method of claim 18, wherein the alcohol is methanol, ethanol, butanol, propanol, iso-propanol, iso-butanol, 3-methylbutanol, or 2-methylbutanol.

20. The method of claim 1, wherein the hydrogen-containing compound is methane and $X=(f_{CHxDy})m$, wherein $f_{CHxDy}$ is the actual fraction of a given isotopomer with x hydrogen atoms and y deuterium atoms and m is the total number of isotopomers considered.

21. The method of claim 20, wherein the function g(X,A) is estimated using calibration data with mixtures of known isotopomer fractions.

22. The method of claim 20, wherein the function g(X,A)=A, where A is a matrix estimated from calibration data using multivariate linear multiple regression.

23. The method of claim 20, wherein the function g(X,A) is a nonlinear function and parameter A is estimated from calibration data using nonlinear multivariate multiple regression.

24. The method of claim 20, wherein the relationship between Y and X is inverted to determine the actual isotopomer fractions given the mass spectrometry peak areas in a test sample as $X=g^{-1}(Y)$ denotes the inverse function of g(X).

25. The method of claim 24, wherein $g^{-1}=A^{-1}$ is a matrix inverse of matrix A.

26. The method of claim 25, wherein $A^{-1}$ is approximated by the pseudoinverse A* of the matrix A in order to obtain a best fit solution to X in a least squares sense.

27. The method of claim 20, wherein the matrix equation comprises Y=AX, wherein:

a) $Y=(f_{m/z=20}, f_{m/z=19}, f_{m/z=18}, f_{m/z=17}, f_{m/z=16})$;

b) $X=(f_{CH4}, f_{CH3D}, f_{CH2D2}, f_{CHD3}, f_{CD4})$; and c) A=a matrix that relates the measured fractions related to the actual fractions.

28. The method of claim 1, wherein the hydrogen-containing compound is ethane ($C_2H_6$) and the matrix equation comprises Y=g(X,A), wherein:

a) $Y=(f_{m/z=30}, f_{m/z=31}, f_{m/z=32}, f_{m/z=33}, f_{m/z=34}, f_{m/z=35}, f_{m/z=36}\ f_{m/z=37})$;

b) $X=(f_{C2H6}, f_{C2H5D}, f_{C2H4D2}, f_{C2H3D3}, f_{C2H2D4}, f_{C2HD5}, f_{C2D6})$; and c) g(X,A)= a function with parameters A that relates the measured fraction related to the actual fractions.

29. The method of claim 1, wherein the hydrogen-containing compound is benzene ($C_6H_6$) and the matrix equation comprises Y=g(X,A), wherein:

a) $Y=(f_{m/z=78}, f_{m/z=79}, f_{m/z=80}, f_{m/z=81}, f_{m/z=82}, f_{m/z=83}, f_{m/z=84})$;

b) $X=(f_{C6H6}, f_{C6H5D}, f_{C6H4D2}, f_{C6H3D3}, f_{C6H2D4}, f_{C6HD5}, f_{C6D6})$; and c) g(X,A)= a function with parameters A that relates the measured fractions related to the actual fractions.

30. The method of claim 1, wherein the hydrogen-containing compound is naphthalene ($C_{10}H_8$) the matrix equation comprises Y=g(X,A), wherein:

a) $(f_{m/z=128}, f_{m/z=129}, f_{m/z=130}, f_{m/z=131}, f_{m/z=132}, f_{m/z=133}\ f_{m/z=134}, f_{m/z=135}, f_{m/z=136},)$;

b) $X=(f_{C10H8}, f_{C10H7D}, f_{C10H6D2}, f_{C10H5D3}, f_{C10H4D4}, f_{C10H3D5}, f_{C2H2D6}, f_{C2HD7}, f_{C2D8})$; and c) g(X,A)= a function with parameters A that relates the measured fractions related to the actual fractions.

31. The method of claim 1, wherein the equation is computed with a general use computer.

* * * * *